United States Patent
Noguchi et al.

(10) Patent No.: US 6,486,258 B1
(45) Date of Patent: Nov. 26, 2002

(54) CONJUGATED DIENE RUBBER COMPOSITION FOR TIRE USE AND TIRE

(75) Inventors: Koukichi Noguchi, Kawasaki (JP); Takahiko Fukahori, Kawasaki (JP); Masao Nakamura, Kawasaki (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 09/719,522

(22) PCT Filed: Jun. 15, 1999

(86) PCT No.: PCT/JP99/03188

§ 371 (c)(1),
(2), (4) Date: Dec. 13, 2000

(87) PCT Pub. No.: WO99/65980

PCT Pub. Date: Dec. 23, 1999

(30) Foreign Application Priority Data

Jun. 15, 1998 (JP) ............................................ 10/183315

(51) Int. Cl.⁷ .............................. C08L 9/00; B60C 1/00
(52) U.S. Cl. ...................... 525/191; 525/232; 525/238; 525/241; 526/335
(58) Field of Search ................................. 525/232, 238, 525/241; 526/335

(56) References Cited

U.S. PATENT DOCUMENTS

| | | | | |
|---|---|---|---|---|
| 3,725,376 A | * | 4/1973 | Trepka et al. ................ | 525/240 |
| 3,817,954 A | * | 6/1974 | Kawakami et al. .......... | 525/240 |
| 4,229,333 A | * | 10/1980 | Wolff et al. .................. | 525/240 |
| 4,647,625 A | * | 3/1987 | Aonuma et al. ............. | 525/232 |
| 4,721,753 A | * | 1/1988 | Sakakibara et al. ........... | 525/99 |
| 5,587,420 A | * | 12/1996 | Takizawa et al. ............ | 524/572 |
| 6,117,927 A | * | 9/2000 | Toba et al. .................. | 524/261 |

* cited by examiner

*Primary Examiner*—Nathan M. Nutter
(74) *Attorney, Agent, or Firm*—Armstrong, Westerman & Hattori, LLP

(57) ABSTRACT

A conjugated diene rubber composition for tires comprising (I) 2–100 weight parts of a high-cis conjugated diene polymer rubber, which is a polymer of conjugated diene monomer alone or with a copolymerizable monomer, and has a cis-bond unit content of at least 40% in the conjugated diene monomer units, and a weight average molecular weight (Mw) of 20,000–10,000,000, and in which the ratio (Mw/Mn) of weight average molecular weight (Mw) to number average molecular weight (Mn) and the weight average molecular weight (Mw) satisfy the formula: log (Mw/Mn)<0.162×log(Mw)−0.682, and (II) 0–98 weight parts of other polymer rubber. A tire comprising at least a tread composed of the above-mentioned conjugated diene rubber composition has very high rebound resilience.

11 Claims, No Drawings

CONJUGATED DIENE RUBBER COMPOSITION FOR TIRE USE AND TIRE

TECHNICAL FIELD

This invention relates to a novel conjugated diene rubber composition for tires having excellent rebound resilience, and a tire comprising the same.

BACKGROUND ART

In recent years, as protection of the environment and energy-saving have gained importance because of the global warming problem, there are increasing demands for low fuel consumption by automobiles. To achieve low fuel consumption by automobiles, low rolling resistance of tires is demanded. To enhance low rolling resistance of tires, it is generally effective to use a rubber material capable of providing a cured rubber having a low hysteresis loss. Conventionally, diene rubbers such as natural rubber(NR), polybutadiene(BR), polyisoprene(IR), styrene-butadiene copolymer rubber are used as a rubber material for tires. These diene rubbers are selected and used singly or in combination, depending on the type of a tire and a part where the rubber material is used. Of these diene rubbers, 1,4-polybutadiene having a high cis-bond content is capable of providing a cured rubber having the highest rolling resistance, i.e., the smallest hysteresis loss; however, conventional 1,4-polybutadiene having a high cis-bond content has a problem in that the hysteresis loss is increased owing to the low molecular weight portion present in its wide molecular weight distribution. It is known that high cis 1,4-polybutadiene having a cis-1,4 bond content of at least 90% is produced by polymerization using a typical coordinated polymerization catalyst which is a combination of an organic aluminum compound with a transition metal compound, i.e., Co-, Ni-, Ti- or Nd-compound, or a rare earth metal compound. When these catalysts are used, however, high-cis 1,4-polybutadiene having narrow molecular weight distribution is not obtained, because as the weight average molecular weight (Mw) increases, the molecular weight distribution (Mw/Mn) becomes wider. Hence, it is known that polybutadiene having a high strength has an undesirably high hysteresis loss.

On the other hand, polybutadiene having a high molecular weight and a narrow molecular weight distribution can be obtained by using an organic lithium catalyst; however, the thus-obtained polybutadiene has a cis-1,4-bond content of not larger than 40% and a low rebound resilience.

As a catalyst for polymerization of olefins, a combination of methylaluminoxane with metallocene type catalyst of a transition metal such as Ti, Zr and Hf has been developed and attracted attention. It is known that, by using these catalysts, α-olefin such as ethylene and propylene can be polymerized with high efficiency to yield a polymer having a narrow molecular weight distribution as well as a narrow composition distribution in the case of copolymers. On the other hand, although there have been attempts to polymerize a conjugated diene such as butadiene and isoprene by using metallocene catalysts, stereo-regulation of a polymer thus obtained has been insufficient.

For example, copolymerization of ethylene or α-olefin with butadiene is disclosed in *Macromol. Chem., Macromol. Symp.*, 1986, vol. 4, page 103–118; *Macromol. Chem.*, 1991, vol. 192, page 2591–2601; and Japanese Patent Publication (Tokuhyou, publication of a translated version of international application) No. H1-501633. In Japanese Unexamined Patent Publication (hereinafter abbreviated to "JP-A") No. H7–112986, a rare earth metal-toluene complex is disclosed as a component of a catalyst, however, the catalyst does not exhibit a high activity for polymerization of a conjugated diene monomer such as butadiene or isoprene, and stereo-regulation of a polymer is difficult.

A catalyst comprising a combination of methylaluminoxane with a metallocene compound selected from $(C_5H_5)TiCl_3$, $(C_5H_5)Ti(OBu)_3$, $(C_5H_5)TiCl_3.2THF$ and $[(C_5H_5)TiCl_2]n$ for polymerization of 1,3-dienes is described in *Makromol. Chem., Macromol. Symp.*, 1995, vol.89, p383–392. A catalyst comprising a combination of an aluminoxane with a transition metal compound for polymerization of 1,3-dienes is described in JP-A H1-254713, JP-A H3-188109 and JP-A H4-331213. When butadiene is polymerized by these catalysts, a polymer having a relatively high cis-bond content is obtained, but, the molecular weight of the polymer thus obtained is relatively low.

A catalyst for polymerization of a conjugated diene comprising a combination of aluminoxane with a transition metal compound of group IV of the periodic table is described in JP-A H9-77818, which has a high activity and gives a polymer with controlled stereoregularity. It is described that, when butadiene was polymerized with this catalyst, the polymerization proceeded at a high activity and a polymer having a cis-bond content of 96% was obtained. However, this patent publication is silent on the molecular weight of the polymer and regulation of the molecular weight distribution.

As stated above, by using conventional methods, it has been difficult to polymerize a conjugated diene monomer with high efficiency to a polymer having a high molecular weight, a narrow molecular weight distribution and a high cis-bond content.

Incidentally, a metallocene catalyst represented by the following formula: $CH_3O(CO)CH_2(C_5H_5)TiCl_3$ is described in *Makromol. Chem., Macromol. Symp.*, 1997, vol.118, p55–60. But, this catalyst is not known to be used for polymerization of a conjugated diene monomer.

Further, in Japanese Examined Patent Publication H6-43517, main-chain modified high-cis poly butadiene is described as preferable from the aspect of rolling resistance and abrasion resistance of tires, but any specific example is not disclosed. In *Makromol. Chem., Macromol. Symp.*, 1997, vol.118, p55–60, a process for preparing a high cis poly butadiene by using a new catalyst is disclosed, but little is reported about the properties of polymer thus obtained, hence it is not known if thus-obtained polymer is usable for tires.

DISCLOSURE OF THE INVENTION

Objects of the present invention are to provide a novel conjugated diene rubber composition for tires having an improved rebound resilience and a tire comprising the same, wherein said conjugated diene rubber composition has a high cis-bond content and a low ratio (Mw/Mn) of weight average molecular weight (Mw) to number average molecular weight (Mn).

Thus, according to the present invention, there is provided a conjugated diene rubber composition for tires comprising:
(I) 2 to 100 percent by weight of a conjugated diene polymer rubber having a high cis-bond content, which is a polymer of conjugated diene monomer or monomers alone or a copolymer of a conjugated diene monomer with a monomer copolymerizable therewith, and characterized in that the content of units having a cis-bond in the total units derived from the conjugated diene monomer is at least 40%; the weight average molecular weight (Mw) is in the range of 20,000 to 10,000,000; and the ratio (Mw/Mn) of weight average molecular weight (Mw) to number average molecular weight (Mn) and the weight average molecular weight (Mw) satisfy the following formula (1):

$$\log(Mw/Mn) < 0.162 \times \log(Mw) - 0.682 \tag{1}$$

and (II) 0 to 98 percent by weight of other polymer rubber.

Further, according to the present invention, there is provided a tire comprising at least a tread which is composed of the above-mentioned conjugated diene rubber composition.

BEST MODE FOR CARRYING OUT THE INVENTION

Conjugated Diene Polymer Having a High Cis-Bond Content (High-Cis Conjugated Diene Polymer)

A high-cis conjugated diene polymer rubber used in the present invention is a polymer of conjugated diene monomer or monomers alone, i.e., a homopolymer of a conjugated diene monomer or a copolymer among conjugated diene monomers, or a copolymer of a conjugated diene monomer with a monomer copolymerizable therewith, and characterized in that the content of units having a cis-bond in the total units derived from the conjugated diene monomer is at least 40%; the weight average molecular weight (Mw) is in the range of 20,000 to 10,000,000; and the ratio (Mw/Mn) of weight average molecular weight (Mw) to number average molecular weight (Mn) and the weight average molecular weight (Mw) satisfy the following formula (1):

$$\log(Mw/Mn) < 0.162 \times \log(Mw) - 0.682 \tag{1}$$

In the case of a copolymer, the content of conjugated diene monomer units is preferably at least 50% by weight, more preferably at least 70% by weight, and most preferably at least 90% by weight, based on the total monomer units.

As specific examples of the conjugated diene monomer, there can be mentioned 1,3-butadiene, 2-methyl-1,3-butadiene, 2,3-dimethyl-1,3-butadiene, 2-chloro-1,3-butadiene, 1,3-pentadiene and 1,3-hexadiene. Of these, 1,3-butadiene is preferable. As specific examples of the monomers copolymerizable with the conjugated monomers, there can be mentioned aromatic vinyl monomers such as styrene, o-methylstyrene, p-methylstyrene, m-methylstyrene, 2,4-dimethylstyrene, ethylstyrene, p-tert.-butylstyrene, α-methylstyrene, α-methyl-p-methylstyrene, o-chlorostyrene, m-chlorostyrene, p-chlorostyrene, p-bromostyrene, 2-methyl-1,4-dichlorostyrene, 2,4-dibromostyrene and vinylnaphthalene; and non-conjugated dienes such as dicyclopentadiene, 5-ethylidene-2-norbornene and 1,5-hexadiene. These conjugated diene monomers may be used either alone or as a combination of at least two thereof.

The high-cis conjugated diene polymer used in the present invention is characterized in that the content of cis-bond in the total units derived from a conjugated diene monomer is at least 40%, preferably at least 80% and more preferably at least 90%. If the content of cis-bond is too small, rebound resilience is reduced. There are no particular limitations for the types of bonds other than cis-bond, i.e., trans-bond and vinyl-bond.

The high-cis conjugated diene polymer used in the present invention has a weight average molecular weight (Mw) in the range of 20,000 to 10,000,000, preferably 50,000 to 5,000,000 and more preferably 100,000 to 3,000,000, as determined by gel permeation chromatography (GPC) using a calibration curve drawn on a standard polybutadiene. If the weight average molecular weight is too small, the mechanical strength such as tensile strength becomes reduced. In contrast, if the weight average molecular weight is too large, viscosity during mixing procedure increases and a burning through molding may be brought about.

In the high-cis conjugated diene polymer used in the present invention, the following formula (2) between weight average molecular weight (Mw) and the ratio (Mw/Mn) of weight average molecular weight (Mw) to number average molecular weight (Mn) is satisfied when A=0.162 and B=0.682

$$\log(Mw/Mn) < A \times \log(Mw) - B \tag{2}$$

Formula (2) is preferably satisfied when A=0.161 and B=0.682, more preferably satisfied when A=0.160, and most preferably satisfied when A=0.159. Further, Formula (2) is preferably satisfied when B=0.684, more preferably satisfied when B=0.684, and most preferably satisfied when B=0.690.

In the high-cis conjugated diene polymer used in the present invention, a low ratio (Mw/Mn) of weight average molecular weight (Mw) to number average molecular weight (Mn) is preferable for any weight average molecular weight (Mw). The ratio is preferably not larger than 1.9, more preferably not larger than 1.7, and most preferably not larger 1.5. If the ratio is too low, rebound resilience generally becomes superior.

Process for Producing Conjugated Diene Polymer

A process for producing conjugated diene polymer used in the present invention is not particularly limited. For example, the conjugated diene polymer is produced by carrying out polymerization in the presence of a catalyst comprising (A) a compound of a transition metal of group IV of the periodic table having a cyclopentadienyl structural unit having a carbonyl group or a sulfonyl group as a substituent, and (B) an aluminoxane or (C) an ionic compound capable of reacting with the transition metal compound (A) to give a cationic transition metal compound.

The above-mentioned transition metal compound (A) with a cyclopentadienyl structural unit having a carbonyl substituent or a sulfonyl substituent is preferably a compound of a transition metal of group IV of the periodic table represented by the following formula (3):

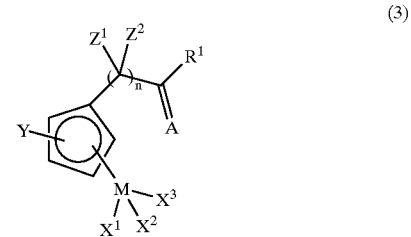

(3)

wherein M is a transition metal of group IV; $X^1$, $x^2$ and $X_3$ are hydrogen, a halogen, a C1–12 hydrocarbon group or a C1–12 hydrocarbon-oxy group; Y is hydrogen or a C1–20 hydrocarbon group which may form a ring together with the cyclopentadienyl group; $Z^1$ and $Z^2$ are hydrogen or a C1–12 hydrocarbon group; A is oxygen or sulfur; $R^1$ is hydrogen, a C1–12 hydrocarbon group or a C1–12 hydrocarbon-oxy group; and n is an integer of 0 to 5.

The transition metal compound of formula (3) is preferably a metallocene compound having as a ligand one cyclopentadienyl group or cyclopentadienyl group with a substituent such as an alkyl, aryl or cycloalkyl group, or fused cyclic substituents. The cyclopentadienyl group as a ligand has an atomic group having a structural unit represented by >C=O or >C=S as a substituent. The transition metal (M in formula (3)) of group IV of the periodic table is preferably Ti, Zr or Hf, and more preferably Ti.

As preferable examples of $X^1$, $X^2$ and $X^3$, there can be mentioned halogens such as chlorine; hydrocarbon groups including alkyl groups such as methyl and neopentyl, and aralkyl groups such as benzyl; and hydrocarbon-oxy groups including alkoxy groups such as methoxy, ethoxy and isopropoxy, and aralkyloxy groups such as benzyloxy. Of the hydrocarbon-oxy groups, an alkoxy group is preferable. As specific examples of Y, there can be mentioned hydrogen, alkyl groups such as methyl, ethyl, propyl, isopropyl, butyl and t-butyl, aryl groups such as phenyl, and aralkyl groups such as benzyl. Y may include a hydrocarbon group containing a silicon atom, such as trimethylsilyl. Y connected to the cyclopentadienyl ring may form, together with the cyclopentadienyl group, a polycyclic group, for example, indenyl and fluorenyl groups.

As specific examples of $Z^1$ and $Z^2$, there can be mentioned hydrogen, alkyl groups such as methyl, ethyl, propyl, isopropyl, butyl and t-butyl, aryl groups such as phenyl, and aralkyl groups such as benzyl. $R^1$ includes hydrogen, hydrocarbon groups and hydrocarbon-oxy groups. As specific examples of the hydrocarbon groups, there can be mentioned alkyl groups such as methyl, ethyl, propyl, isopropyl, butyl and t-butyl, aryl groups such as phenyl, and aralkyl groups such as benzyl; and, as specific examples of the hydrocarbon-oxy groups, there can be mentioned alkoxy groups such as methoxy, ethoxy, propoxy, isopropoxy, butoxy and t-butoxy, aryloxy groups such as phenoxy, and aralkyloxy groups such as benzyloxy. Of these, alkoxy groups are preferable as hydrocarbon-oxy groups, and n is preferably 1 or 2, and more preferably 1.

As specific examples of the compound (A) with a transition metal of group IV of the periodic table represented by the formula (3), there can be mentioned those which are represented by the formulae: MeO(CO)CH$_2$CpTiCl$_3$, MeO(CO)CH(Me)CpTiCl$_3$ and {3-[MeO(CO)CH$_2$]}(1-Me)CpTiCl$_3$, wherein Me is a methyl group and Cp is a cyclopentadienyl group.

The procedure by which the transition metal compound (A) represented by the formula (3) is prepared is not particularly limited. For example, MeO(CO)CH$_2$CpTiCl$_3$ can be prepared by the procedure described in *Macromol. Symp.*, 1997, vol. 118, p55–60.

An aluminoxane used in combination with the compound (A) with a transition metal of group IV of the periodic table, is a straight-chain or cyclic polymer, which is an organic aluminumoxy compound and is represented by the following formula (4):

(—Al(R$^2$)O—)$_n$  (4)

wherein $R^2$ is a C1–10 hydrocarbon group, which includes, for example, alkyl groups such as methyl, ethyl, propyl and isobutyl. Of these, methyl is most preferable. R may have a substituent such as halogen and/or an R$^3$O group wherein R$^3$ is a C1–10 hydrocarbon group, which includes, for example, alkyl groups such as methyl, ethyl, propyl and isobutyl. Of these, methyl is most preferable, and n is a degree of polymerization, and at least 5, preferably at least 10.

As specific examples of the ionic compound (C) capable of reacting with the transition metal compound (A) to form a cationic complex, there can be mentioned ionic compounds which are a combination of tetrakis(pentafluorophenyl) borate anion with an amine cation having an active proton such as, for example, $(CH_3)_2N(C_6H_5)H^+$, a tri-substituted carbonium cation such as $(C_6H_5)_3C^+$, a carborane cation, a metal carborane cation or a transition metal-having ferrocenium cation.

The catalyst of the present invention may be used, for polymerization of a conjugated monomer, in combination with a hydrogenated metal compound, an organic metal compound containing a main-group metal element of groups I, II and III of the periodic table, an organic metal halide compound and a hydrogenated organic metal compound.

Specific examples include hydrogenated metal compounds such as NaH, LiH, CaH$_2$, LiAlH$_4$ and NaBH$_4$; main-metal group-containing organic metal compounds such as methyllithium, butyllithium, phenyllithium, dibutylmagnesium, trimethylaluminum, triethylaluminum, triisobutylaluminum, trihexylaluminum and trioctylaluminum; organic metal halide compounds such as ethylmagnesium chloride, butylmagnesium chloride, dimethylaluminum chloride, diethylaluminum chloride, sesquiethylaluminum chloride and ethylaluminum dichloride; and hydrogenated organic metal compounds such as diethylaluminum hydride and sesquiethylaluminum hydride.

The transition metal compound and/or the ionic compound used in the present invention can be used in a form supported by a carrier. The carrier includes inorganic compounds and organic polymers.

The inorganic compounds preferably include inorganic oxides, inorganic chlorides and inorganic hydroxides. The inorganic compounds may contain a minor amount of carbonate salts or sulfate salts. As preferable specific examples of the inorganic compounds, there can be mentioned inorganic oxides such as silica, alumina, magnesia, titania, zirconia and calcia, and inorganic chlorides such as magnesium chloride. These inorganic compounds are preferably in the form of finely divided porous particles having an average particle diameter of 5 to 150 μm and a specific surface area of 2 to 800 m/g. The porous particles may be heat-treated, for example, at a temperature of 100 to 800° C. to remove volatile compounds.

The organic polymers preferably include those which have as a side chain an aromatic ring, a substituted aromatic ring, or functional groups such as hydroxyl, carboxyl, ester and halogen. As specific examples of the organic polymers, there can be mentioned homopolymers and copolymers of a-olefin such as ethylene, propylene and butene which have a functional group introduced therein by chemical modification and copolymers of ethylene, propylene or butene; and homopolymers, copolymers and chemically modified polymers thereof of monomers such as acrylic acid, methacrylic acid, vinyl chloride, vinyl alcohol, styrene and divinylbenzene. The organic polymers are preferably in the form of finely divided spherical particles having an average particle diameter of 5 to 250 μm. When the transition metal compound and/or the ionic compounds are supported by these carriers, deposition of the catalyst onto a polymerization reactor can be prevented.

The polymerization of a conjugated diene monomer or monomers alone or in combination with a copolymerizable monomer is carried by a method selected from the following methods (1) to (6) using a catalyst comprising the transition metal compound (A) and the aluminoxane (B) and/or the ionic compound (C).

(1) Component (A) is previously contacted with component (B) or component (C), and then the mixture is placed into contact with a monomer to conduct polymerization.

(2) Component (A) is previously contacted with a monomer, and then the mixture is placed into contact with component (B) or component (C) to conduct polymerization.

(3) Component (B) or component (C) is previously contacted with a monomer, and then the mixture is placed into contact with component (A) to conduct polymerization.

(4) A solution of component (A) and a solution of component (B) or component (C) are mixed together, the mixed solution is placed in contact with a carrier, the thus-formed supported catalyst is separated from the mixed solution, and then the supported catalyst is placed into contact with a monomer to conduct polymerization.

(5) A solution of component (A) is contacted with a carrier, the thus-obtained solution is then contacted with a solution of component (B) or component (C), and the thus-formed supported catalyst is separated from the mixed solution, and then the supported catalyst is placed into contact with a monomer to conduct polymerization.

(6) A solution of component (B) or component (C) is contacted with a carrier, the thus-obtained solution is then contacted with a solution of component (A), and the thus-formed supported catalyst is separated from the mixed solution, and then the supported catalyst is placed into contact with a monomer to conduct polymerization.

Of these procedures (1) to (6), from the aspect of enhancement of efficiency of polymerization initiator, polymerization activity and narrower molecular weight distribution, procedures (1), and (4) to (6) are preferable, wherein transition metal compound (A) and the aluminoxane (B) and/or the ionic compound (C) are previously contacted with each other, and, after a lapse of aging time, a monomer is placed. Procedure (1) is most preferable. By using this procedure, a conjugated diene polymer having a very low ratio (Mw/Mn) of weight average molecular weight (Mw) to number average molecular weight (Mn) is easily obtained.

The transition metal compound (A), component (B) and component (C) may be used either in a state of a solution or a slurry, and may be in a different state from each other, unless otherwise described. A solution state is preferable because of high polymerization activity. The liquid medium used to form a solution or a slurry includes inert hydrocarbons such as butane, pentane, hexane, heptane, octane, cyclohexane, mineral oil, benzene, toluene and xylene; and halogenated hydrocarbons such as chloroform, methylene chloride, dichloroethane and chlorobenzene.

Contact of component (A), component (B) or component (C) with the monomer is usually carried out at a temperature range of −100° C. to +100° C. for 1 second to 180 minutes.

The amount of the catalyst used is such that the amount of the transition metal compound (A) is usually in the range of 100 to 0.001 milli-moles, preferably 10 to 0.01 milli-moles and more preferably 5 to 0.1 milli-moles, per mole of the monomer. When an aluminoxane is used as a component, the ratio by mole of aluminoxane/transition metal compound is usually in the range of 10 to 10,000, preferably 5.0 to 100. When the ionic compound is used as a component, the ratio by mole of ionic compound/transition metal compound is usually in the range of 0.01 to 100, preferably 0.1 to 10. Further, when an organic metal compound is also used, the ratio by mole of organic metal compound/transition metal compound is usually in the range of 0.1 to 10,000, preferably 1 to 1,000.

The homopolymerization of a conjugated diene monomer, and the copolymerization of a conjugated diene monomer with a copolymerizable monomer are usually carried out in an inert hydrocarbon medium by solution polymerization, slurry polymerization, or bulk polymerization in which a monomer is used as a diluent. A vapor phase polymerization procedure using a vapor phase stirred reaction vessel or a vapor phase fluidized bed can also be employed. These polymerization procedures can be carried out at a temperature of −100° C. to +110° C. and a pressure of ordinary pressure to 30 kg/cm2 for 1 second to 360 minutes. The inert hydrocarbon medium used includes those which are hereinbefore recited.

It is possible that a conjugated diene monomer is preliminary polymerized by the above-mentioned polymerization procedure, and, by using the thus-obtained polymer as a catalyst, a further conjugated diene monomer is polymerized. This procedure is advantageous for enhancing polymerization activity, keeping the form of a solid catalyst, making easy the operation of introducing a catalyst into a polymerization vessel for the further polymerization, preventing or minimizing the deposition of catalyst on a wall of the polymerization vessel, and enhancing the fluidity of the reaction mixture in a vapor phase polymerization vessel.

To control the molecular weight of a polymer, a chain transfer agent can be added. As the chain transfer agent, those which are conventionally used for the production of cis-1,4-polybutadiene are used. Arenes such as 1,2-butadiene and cyclic dienes such as cyclooctadiene are especially preferable.

As a process for polymerizing conjugated diene monomers using the catalyst, a continuous polymerization process, a semi-batch polymerization process and a batch polymerization process can be employed. To obtain low Mw/Mn ratio, a semi-batch polymerization process or a batch polymerization process is preferable, and a batch polymerization process is more preferable.

The termination of polymerization is usually carried out by adding an active proton compound such as an alcohol, water, a primary amine or a secondary amine into the polymerization system when the predetermined conversion is reached. The alcohol used may be, for example, methanol, ethanol, propanol, isobutanol and butanol.

After the termination of polymerization, an antioxidant, a neutralizing agent, a dispersing agent etc. are added, according to the need, to polymerization reaction mixture which is a rubber-like polymer solution.

The kind and amount of a stabilizer used, according to the need, in the present invention are not particularly limited. The antioxidant includes, for example, phenolic stabilizers, sulfur-containing stabilizers, phosphorus-containing stabilizers and amine stabilizers. The phenolic stabilizers are described, for example, in JP-A H4-252243. As specific examples of the phenolic stabilizers, there can be mentioned 2,6-di-tert.-butyl-4-methylphenol, 2,6-di-tert.-butyl-4-ethylphenol, 2,6-di-tert.-butyl-4-butylphenol, 2,6-di-tert.-butyl-4-isobutylphenol, 2-tert.-butyl-4,6-dimethylphenol, 2,4,6-tricyclohexylphenol, 2,6-di-tert.-butyl-4-methoxylphenol, 2,6-di-phenol-4-octadecyloxyphenol, n-octadecyl-3-(3',5'-di-tert.-butyl-4-hydroxyphenyl) propionate, tetrakis-[methylene-3-(3',5'-di-tert.-butyl-4'-hydroxyphenyl)-propionate]-methane, 1,3,5-trimethyl-2,4,6-tris(3,5-di-tert.-butyl-4-hydroxybenzyl)benzene, 2,4-bis-(octylthiomethyl)-6-methylphenol, 2,4-bis(2',3'-dihydroxypropylthiomethyl)-3,6-dimethylphenol and 2,4-bis(2'-acetyloxyethylthiomethyl)-3,6-dimethylphenol. As specific examples of the sulfur-containing stabilizers, there can be mentioned dilauryl thiodipropionate, distearyl thiodipropionate, aminothioglycolate, 1,1'-thiobis(2-naphthol), ditridecyl thiodipropionate and distearylβ,β'-thiodipropionate. The phosphorus-containing stabilizers are also known, and, as specific examples thereof, there can be mentioned tris(nonylphenyl)phosphite, cyclic neopentanetetraylbis-(octadecylphosphite) and tris(2,4-di-tert.-butylphenyl)-phosphite. As specific examples of the amine stabilizers, there can be mentioned phenyl-α-naphthylamine, phenyl-β-naphthylamine, aldol-β-naphthylamine, p-isopropoxy-diphenylamine, p-(p-toluenesulfonylamide)-diphenylamine, bis(phenylisopropylidene)-4,4'-diphenylamine, N,N'-diphenylethylenediamine, N,N'-diphenylpropylenediamine, octylated diphenylamine, N,N'-diphenyl-p-phenylenediamine and N-isopropyl-N'-phenyl-p-phenylenediamine.

The amount of the stabilizer is usually in the range of 0.01 to 5.0 parts by weight, preferably 0.05 to 2.5 parts by weight, based on 100 parts by weight of the conjugated diene polymer. When the amount of the stabilizer is too small, the effect of the antioxidant is not manifested and the polymer has poor heat-resistance. In contrast, when the amount of the stabilizer is too large, the conjugated diene polymer exhibits heat discoloration. The antioxidant may be used alone or as a combination of at least two thereof.

The stabilizer can be added simultaneously when the polymerization terminator is added, or can be added to rubber-like polymer solution after the addition of the polymerization terminator. When two or more kinds of stabilizers are used, they can be pre-mixed or added separately. The stabilizer may be compounded by using mixing machines such as single or twin screw extruder, Banbury mixer, roll and kneader; however, addition thereof after the polymerization step in polymerization process is preferable to prevent deterioration caused by heat-treatment in a drying process.

When halogen-containing compound is used as a compound of a transition metal of group IV of the periodic table, it is preferable to neutralize butadiene polymer solution. As a neutralizing agent to be compounded, there can be mentioned basic oxide of alkali metal or alkali earth metal, hydroxide of alkali metal or alkali earth metal, salt of strong alkali with weak acid, ammonia, or nitrogen-containing organic compound.

As specific examples of the basic oxide of alkali metal, there can be mentioned $Na_2O$, $K_2O$ and $Li_2O$. As specific examples of the basic oxide of alkali earth metal, there can be mentioned CaO, MgO and BaO. As specific examples of the hydroxide of alkali metal, there can be mentioned NaOH, KOH and LIOH. As specific examples of the hydroxide of alkali earth metal, there can be mentioned $Ca(OH)_2$, $Mg(OH)_2$ and $Ba(OH)_2$. As specific examples of the salt of strong alkali with weak acid, there can be mentioned $Na_2CO_3$, $K_2CO_3$ and $Li_2CO_3$, $CH_3COONa$, $CH_3COOK$ and $CH_3COOLi$. Examples of the nitrogen-containing organic compound are amines and nitrogen-containing hetero-cyclic compounds. As specific examples of the amines, there can be mentioned amino alcohols such as ethanolamine, N,N-diethyl-ethanolamine, N,N-dimethyl-ethanolamine, N-methyl-N,N-diethanolamine, N,N-dibutyl-ethanolamine, N-methyl-ethanolamine; ethylamine, diethylamine, triethylamine, 2-ethyl-hexylamine, di-2-hexyl amine, diisobutylamine, propylamine; ethyleneamines such as ethylenediamine, diethylenetriamine, triethylenetatraamine, tetraethylenepentaamine, pentaethylenehexaamine; cyclohexylamine, methylamine, dimethylamine, trimethylamine, diphenylamine, dibenzylamine, benzylamine, aniline, N-ethylaniline, N,N'-dimethylaniline, benzylethylaniline. As specific examples of the nitrogen-containing hetero-cyclic compounds, there can be mentioned pyridines, piperidine, piperazine. Of these, hydroxide of alkali metal or alkali earth metal, and salts of strong alkali with weak acid are preferable.

The amount of the neutralizing agent is preferably in the range of 0.1 to 10 equivalents, more preferably in the range of 0.3 to 5 equivalents, and most preferably in the range of 0.5 to 3 equivalents to halogen in the halogen-containing transition metal compound.

The procedure of recovering the conjugated diene polymer from a polymer solution using the above-mentioned catalyst is not particularly limited. For example, a steam-stripping procedure which is a conventional procedure for recovering a polymer from a rubber-like polymer solution can be used. A procedure to dehydrate and dry a butadiene polymer crumb after steam-stripping is not particularly limited. Conventional dehydration procedures can be used. As an example of the conventional procedure, there can be used a process in which the conjugated diene polymer crumb is separated from hot water using an oscillating screen, placed into compression water squeezer to reduce the water content in the crumb to 5 to 25% by weight, and is dried by extrusion dryer and/or hot air dryer to the water content of at most 1% by weight.

Rubber Composition for Tires

The rubber composition for tires of the present invention comprises (I) 2 to 100 percent by weight of the above-mentioned conjugated diene polymer rubber having a high cis-bond content, (II) 0 to 98 percent by weight of other polymer rubber, and ingredients for rubber composition conventionally used in the rubber industry. As the polymer rubber (II), diene rubbers other than above-mentioned high-cis conjugated diene polymer rubber are preferable. The amount of the high-cis conjugated diene polymer rubber is preferably in the range of 10 to 100% by weight, more preferably in the range of 20 to 90% by weight, and most preferably in the range of 30 to 80% by weight, based on the total weight of the polymer rubbers. If the amount of the high-cis conjugated diene polymer rubber is too small, the effect of the present invention is not manifested.

As the diene rubber (II) used together with the conjugated diene polymer rubber (I), there can be mentioned, for example, natural rubber (NR), polyisoprene rubber (IR), styrene-butadiene copolymer rubber (SBR) produced by emulsion polymerization, random SBR (bound styrene content: 5–50% by weight, 1,2-vinyl content of butadiene units: 10–80%) produced by solution polymerization, high-trans SBR (1,4-trans content of butadiene units: 70–95%), low-cis polybutadiene rubber (BR), high-trans BR (1,4-trans content of butadiene units: 70–95%), styrene-isoprene copolymer rubber (SIR), butadiene-isoprene copolymer rubber, random styrene-butadiene-isoprene copolymer rubber (SIBR) produced by solution polymerization, random styrene-butadiene-isoprene copolymer rubber produced by emulsion polymerization, styrene-acrylonitrile-butadiene copolymer rubber produced by emulsion polymerization, acrylonitrile-butadiene copolymer rubber, and block copolymers, for example, high-vinyl SBR-low-vinyl SBR block copolymer rubber and polystyrene-polybutadiene-polystyrene block copolymer. These rubbers can be appropriately selected so as to satisfy the properties required for the rubber composition. Of these, preferred are NR, IR, SBR and SIBR with NR and IR being particularly preferred in view of the processability. These diene rubbers can be used singly or in combination of at least two thereof.

Preferred ratio of the high-cis conjugated diene polymer rubber to the diene rubber is in the range of 10/90 to 90/10 by weight, preferably 20/80 to 70/30 in the case of the high-cis conjugated diene polymer rubber/natural rubber or synthetic isoprene rubber, and 80–20/10–70/10–70 by weight in the case of the high-cis conjugated diene polymer rubber/natural rubber or synthetic isoprene rubber/styrene-butadiene copolymer rubber.

As the ingredients for rubber composition, there can be used, for example, a reinforcing agent, an extender oil and a vulcanizing agent. As to the reinforcing agent, there is no particular limitation, and there can be used, for example, carbon black, silica, and various reinforcing agents conventionally used for general purpose rubbers.

As specific examples of carbon black, there can be mentioned various grades such as SAF, ISAF, ISAF-HS, ISAF-LS, HAF, HAF-HS, HAF-LS and FEE, and can be appropriately chosen according to the application purpose. The amount of carbon black used is preferably 20 to 150 parts by weight, more preferably 30 to 120 parts by weight, and most preferably 40 to 100 parts by weight per 100 parts by weight of the rubber component. If the amount of the reinforcing agent is too small, tensile strength and abrasion resistance are lowered because of low reinforcing effect; in contrast, if the amount is too large, rebound resilience and exothermic property are undesirably poor.

Moreover, silica can be used as a reinforcing agent. As silica used in the present invention, silica conventionally used for general purpose rubbers can be used. As examples of silica, there can be mentioned, dry method white carbon, wet method white carbon, colloidal silica and precipitated silica disclosed in JP-A S62-62838. Of these, particularly preferred is wet method white carbon composed mainly of hydrated silica. There is no particular restriction as to the specific surface area of the silica, but is preferably in the range of 50 to 400 m$^2$/g, more preferably 100 to 250 m$^2$/g, and most preferably 120 to 190 m$^2$/g, as measured by nitrogen adsorption according to the BET method. If the specific surface area of silica is too small, reinforcing effect becomes insufficient; in contrast, if the specific surface area is too large, processability is insufficient. The specific surface area measured by nitrogen adsorption is a value measured according to the BET method specified by ASTM D 3037–81. The amount of silica or other reinforcing agent used is preferably 10 to 150 parts by weight, more preferably 20 to 120 parts by weight, and most preferably 40 to 80 parts by weight per 100 parts by weight of the rubber component. If the amount is too small, reinforcing effect is reduced; in contrast, if the amount is too large, processability is undesirably lowered because of viscosity-increase of unvulcanized rubber composition.

These reinforcing agents can be used singly or in combination of two or more of them. When silica is used as a reinforcing agent, it is preferable to add a silane coupling agent to improve rebound resilience and abrasion resistance. There is no particular limitation as to the kind of silane coupling agent. Commercially available silane coupling agents can be used.

The extender oil is selected from those of paraffinic type, naphthenic type and aromatic type so as to meet the intended application of the rubber composition. The amount of the extender oil used is in the range of 1 to 150 parts by weight, more preferably 2 to 100 parts by weight, and most preferably 3 to 60 parts by weight per 100 parts by weight of the rubber component. If the content of the extender oil is too small, the reinforcing agent is not well dispersed; in contrast, if the content is too large, tensile strength and abrasion resistance are undesirably lowered.

As the vulcanizing agent, there can be used sulfur vulcanizing agents such as sulfur and sulfur donating compound, and peroxides vulcanizing agents. The amount of the vulcanizing agent used is preferably in the range of 0.05 to 5 parts by weight per 100 parts by weight of the rubber component. When sulfur is used as a vulcanizing agent, the amount thereof is preferably 1 to 3 parts by weight per 100 parts by weight of the rubber component.

The rubber composition of the present invention can comprise, besides the above-mentioned components, other ingredients according to applications of the present invention. Other ingredients include a vulcanizing aid such as stearic acid or zinc white, a vulcanization accelerator such as sulfenamide type, thiuram type or guanidine type vulcanization accelerator, a filler such as calcium carbonate or talc, an antioxidant of amine type or phenol type, an antiozonant, a processing aid, an adherence-imparting agent, and a wax.

The rubber composition of the present invention can be produced by mixing the above-mentioned ingredients using a known kneader for rubber, for example, a roll or a Banbury mixer.

Most important application of the rubber composition of the present invention is tires. The rubber composition is molded to tires by the same procedure with that of for other diene rubbers. It is preferable to compose the whole parts of a tire by the rubber composition of the present invention; however, while a tread part is composed by the rubber composition of the present invention, other parts of a tire such as a carcass, a side-wall and a bead may be composed of other type rubbers. As the other type rubbers, it is preferable to select among polymer rubbers exemplified as the other diene rubber used for preparing the rubber composition of the present invention together with the high-cis conjugated diene polymer rubber.

The present invention is hereinafter described more specifically by way of examples and comparative examples. In these working examples, parts and % are by weight unless otherwise specified. Evaluation of various properties were made according to the following methods.

(1) Weight Average Molecular Weight (Mw) and Number Average Molecular Weight (Mn)

The weight average molecular weight (Mw) and the number average molecular weight (Mn) were determined by using HLC-8020 gel permeation chromatography supplied by Tosoh Corp. under the following conditions: two columns connected-in-series (GMH-XL supplied by Tosoh Corp.), column temperature: 40° C., eluate: tetrahydrofuran, elution rate: 1.0 ml/min., sample concentration: 8 mg/20 ml(tetrahydrofuran). The molecular weight was determined from a calibration curve drawn by using a standard polybutadiene specimen.

(2) Microstructure (Cis-1,4-Bond Content) of Polybutadiene

The microstructure of polybutadiene was determined by NMR analysis as follows. The content of cis-1,4-bond in the polymer was determined by $^1$H-NMR analysis (1,4-bond: 5.4–5.6 ppm, 1,2-bond: 5.0–5.1 ppm). The content of cis-bond was calculated from $^{13}$C-NMR (cis: 28 ppm, trans: 38 ppm), thus determining the cis-1,4-bond content in the total polymer.

(3) Mooney Viscosity

The Mooney viscosity (ML$_{1+4}$, 100° C.) was determined according to JIS K6301 by Mooney viscometer (SMV-201, supplied by Shimadzu Corp.) with L-type rotor. The measurement was carried out after a lapse of four minutes from one minute preheating.

(4) Tensile Strength, Elongation and 300% Modulus

Tensile strength, elongation and 300% modulus were measured by the tensile test described in JIS K6301.

(5) Rebound Resiliency

Rebound resiliency was measured at 60° C. using a Lupke pendulum by JIS K 6301.

Synthesis of (2-methoxycarbonylmethyl) cyclopentadienyl-trichlorotitanium MeO(CO)CH$_2$CpTiCl$_3$ A solution of 30.6 g (200 mmol) of methyl bromoacetate in 100 ml of tetrahydrofuran was gradually dropwise added to a solution of 32 g (200 mmol) of trimethylsilylcyclopentadienyl-sodium in 400 ml of tetrahydrofuran in an argon atmosphere at −78° C. After completion of the addition, the reaction mixture was further maintained at −78° C. overnight with stirring. Then tetrahydrofuran was distilled off under a reduced pressure, and the obtained solid was filtered off and subjected to vacuum distillation (65–66° C./3 mmHg) to yield about 30 g of (2-methoxycarbonylmethyl)trimethylsilylcyclopentadiene [TMSCpCH$_2$COOMe]. Yield: 70%. The chemical structure was confirmed by $^1$H-NMR.

$^1$H-NMR (ppm, TMS, CDCl$_3$): 6.55–6.20(m, hydrogen connected to carbon constituting double bond in cyclopentadiene), 3.5–3.35(m, hydrogen connected to carbon constituting double bond in cyclopentadiene), 3.15–2.98 (m, hydrogen connected to carbon constituting double bond in cyclopentadiene), 3.69(s, 2H), 3.67(s, 3H), −0.22(s, 9H).

To a solution of 4.2 g (20 mmol) of (2-methoxycarbonylmethyl)trimethylsilylcyclopentadiene in 100 ml of dry methylene chloride, 3.8 g (20 mmol) of titanium tetrachloride was added at 0° C. in an argon atmosphere. The mixture was stirred at room temperature for 3 hours. The reaction mixture was cooled to −30° C. to precipitate 4.0 g of orange crystal. Yield: 70%. The product was identified as 2-methoxycarbonylmethyl) cyclopentadienyl-trichlorotitanium by $^1$H-NMR analysis.

$^1$H-NMR (ppm, TMS, CDCl$_3$): 7.05(s, 4H), 3.92(s, 2H), 3.76(s, 3H)

POLYMERIZATION EXAMPLE 1

To a solution in toluene of 12.2 mmol of methylaluminoxane (supplied by Tosoh-Akzo Co.), a solution in toluene of 0.0122 mmol of the 2-methoxycarbonylmethyl) cyclopentadienyl-trichlorotitanium (MeO(CO)CH$_2$CpTiCl$_3$, hereinafter abbreviated to "TiES") was added dropwise, and the mixture was kept aging at −25° C. for 1 hour. A sealable pressure-resistant glass ampoule having an inner volume of 150 ml was charged with 52.4 g of toluene and 5.5 g of butadiene in a nitrogen atmosphere, and the content was kept at 0° C. Then, the above-mentioned aged catalyst was added to the ampoule, butadiene was polymerized at 0° C. for 5 minutes. Thereafter a small amount of an aqueous acidic methanol was added to terminate the polymerization. The polymerization mixture was poured in a large amount of acidic methanol to precipitate a white solid. The solid was filtered off and dried to yield a butadiene polymer A. The yield of polymer was 75% by weight.

The content of the cis-bond in the butadiene polymer A was 92%. The weight average molecular weight (Mw) was 1,283,100. The ratio of the weight average molecular weight (Mw) to the number average molecular weight (Mn) was 1.41. It was confirmed that log(Mw/Mn)=0.149 and [0.162× log(Mw)−0.682]=0.308, and thus, "log(Mw/Mn)=0.162×log (Mw)−0.682" was satisfied.

POLYMERIZATION EXAMPLE 2

To a solution in toluene of 12.2 mmol of methylaluminoxane (supplied by Tosoh-Akzo Co.), a solution in toluene of 0.0122 mmol of the TiES was added dropwise, and the mixture was kept aging at 50° C. for 20 minutes. A sealable pressure-resistant glass ampoule having an inner volume of 150 ml was charged with 52.4 g of toluene and 3.3 g of butadiene in a nitrogen atmosphere, and the content was kept at −12° C. Then, the above-mentioned aged catalyst was added to the ampoule, butadiene was polymerized at −25° C. for 30 minutes. Thereafter a small amount of an aqueous acidic methanol was added to terminate the polymerization. The polymerization mixture was poured in a large amount of acidic methanol to precipitate a white solid. The solid was filtered off and dried to yield a butadiene polymer B. The yield of polymer was 81% by weight.

The content of the cis-bond in the butadiene polymer B was 92%. The weight average molecular weight (Mw) was 1,177,100. The ratio of the weight average molecular weight (Mw) to the number average molecular weight (Mn) was 1.49. It was confirmed that log(Mw/Mn)=0.173 and [0.162× log(Mw)−0.682]=0.301, and thus, "log(Mw/Mn) 0.162×log (Mw)−0.682" was satisfied.

EXAMPLE 1

In a 250-ml Banbury mixer, the butadiene polymer A was mixed with ingredients (other than sulfur and vulcanization accelerator) according to the following formulation. The resulting mixture was mixed with sulfur and a vulcanization accelerator, using a roll, to prepare a rubber composition.

| Formulation | (parts) |
| --- | --- |
| Butadiene polymer A | 100 |
| Stearic acid | 2 |
| Zinc oxide #1 | 3 |
| HAF carbon | 50 |
| Aromatic oil | 5 |
| Antioxidant *1 | 1 |
| Sulfur | 1.5 |
| Vulcanization accelerator *2 | 1.1 |

*1 N-(1,3-dimethylbutyl)-N'-phenyl-p-phenylenediamine.
*2 N-cyclohexyl-2-benzothiazolesulfenamide The rubber compositions thus obtained was subjected to press vulcanization at 160° C. for 15 minutes, and test pieces were prepared for measurement of tensile strength, elongation, 300% modulus and rebound resilience. The results are shown in Table 1, wherein each result is shown in the form of an index assuming the corresponding result in the following comparative example 1 has an index 100.

EXAMPLE 2

According to the same procedure as described in Example 1, except the butadiene polymer A was replaced by the butadiene polymer B, a rubber composition was prepared and specimens were prepared. Tensile strength, elongation, 300% modulus and rebound resilience were measured. The results are shown in Table 1, wherein each result is shown in the form of an index assuming the corresponding result in the following comparative example 1 has an index 100.

COMPARATIVE EXAMPLE 1

According to the same procedure as described in Example 1, except the butadiene polymer A was replaced by a commercially available butadiene polymer (UBEPOL-BR 150L, Mw: 493,000, Mw/Mn: 2.53, cis content: 95.1%, supplied by Ube Ind.), a rubber composition was prepared and specimens were prepared. Tensile strength, elongation, 300% modulus and rebound resilience were measured. The results are shown in Table 1, wherein each result hereof is shown as an index 100.

TABLE 1

|  | Example 1 | Example 2 | Com. Ex. 1 |
|---|---|---|---|
| Mw | 1,283,100 | 1,177,100 | 493,300 |
| Mw/Mn | 1.41 | 1.49 | 2.53 |
| Cis-1,4-bond content (%) | 92 | 92 | 95.1 |
| Tensile strength | 115 | 112 | 100 |
| Elongation | 109 | 104 | 100 |
| 300% Modulus | 115 | 113 | 100 |
| Rebound resilience at 60° C. | 107 | 106 | 100 |

As is shown in Table 1, the rubber composition of the present invention has a superior rebound resilience.

INDUSTRIAL APPLICABILITY

The rubber composition of the present invention has good processability, abrasion resistance, rebound resilience, exothermic property and tensile properties. Among all, rebound resilience is excellent. Thus, by making use of this advantage, the rubber composition can be used for various applications, for example, a tire tread, a carcass, a side-wall and a bead; rubber parts such as hose, window seal, belt, vibration insulator, and automobile parts; and reinforcing rubbers for plastics such as high-impact polystyrene and ABS resin.

Particularly, the rubber composition of the present invention, by making use of the above-mentioned advantage, can be used for a tire tread and a side-wall and the like of low-fuel consumption tires; moreover, it can be used for a tire tread, a side-wall, an undertread, a carcass, a bead and the like of all-season tires, high performance tires, truck/bus tires and studless tires.

What is claimed is:

1. A conjugated diene rubber composition for tires, comprising:
   (I) a high-cis conjugated diene polymer rubber, and
   (II) a second polymer rubber that is different from the high-cis conjugated diene polymer rubber (I);
   wherein the amounts of (I) and (II) are 2% to 100% by weight and 98% to 0% by weight, respectively, based on the total weight of the polymer rubbers; and
   wherein said high-cis conjugated diene polymer rubber is a polymer of 1,3-butadiene monomer or a copolymer of 1,3-butadiene monomer with other conjugated diene monomer or with a monomer other than the conjugated diene monomer; the content of units having a cis-bond in the total units derived from the 1,3-butadiene monomer and the conjugated diene monomer is at least 80%; the weight average molecular weight (Mw) of said high-cis conjugated diene polymer rubber is in the range of 20,000 to 10,000,000; the ratio (Mw/Mn) of weight average molecular weight (Mw) to number average molecular weight (Mn) in said high-cis conjugated diene polymer rubber is not larger than 1.9; and said ratio (Mw/Mn) and said weight average molecular weight (Mw) satisfy the following formula (1):

$$\log(Mw/Mn) < 0.162 \times \log(Mw) - 0.682 \qquad (1).$$

2. The conjugated diene rubber composition according to claim 1 wherein the high-cis conjugated diene polymer rubber contains at least 50% by weight of 1,3-butadiene units.

3. The conjugated diene rubber composition for tires according to claim 1 wherein the content of units having a cis-bond in the total units derived from the 1,3-butadiene monomer and the conjugated diene monomer is at least 90%.

4. The conjugated diene rubber composition for tires according to claim 1, wherein the ratio (Mw/Mn) of weight average molecular weight (Mw) to number average molecular weight (Mn) is not larger than 1.7.

5. The conjugated diene rubber composition for tires according to claim 1, wherein the ratio (Mw/Mn) of weight average molecular weight (Mw) to number average molecular weight (Mn) is not larger than 1.5.

6. The conjugated diene rubber composition for tires according to claim 1, wherein the content of the high-cis conjugated diene polymer (I) is in the range of 10% to 100% by weight based on the total weight of the polymer rubbers.

7. The conjugated diene rubber composition for tires according to claim 1, which further comprises 10 to 150 parts by weight of silica based on 100 parts by weight of the polymer rubbers.

8. The conjugated diene rubber composition for tires according to claim 1 which further comprises 20 to 150 parts by weight of a carbon black based on 100 parts by weight of the polymer rubbers.

9. The conjugated diene rubber composition for tires according to claim 1 which further comprises 10 to 150 parts by weight of an extender oil based on 100 parts by weight of the polymer rubbers.

10. The conjugated diene rubber composition for tires according to claim 1, which further comprises 0.05 to 5 parts by weight of a sulfur curing agent or a peroxide curing agent based on 100 parts by weight of the polymer rubbers.

11. A tire comprising a tread which is composed of the conjugated diene rubber composition for tires as claimed in claim 1.

* * * * *